(12) United States Patent
Vangpat et al.

(10) Patent No.: US 12,476,961 B2
(45) Date of Patent: Nov. 18, 2025

(54) SYSTEMS AND METHODS FOR GENERATING DIGITAL ACCESS TOKENS INDEPENDENTLY COMSUMABLE BY A PIGGY-BACK SERVICE SYSTEM

(71) Applicant: Salesforce, Inc., San Francisco, CA (US)

(72) Inventors: Alan Vangpat, Pittsburgh, PA (US); Koson Thambundit, San Francisco, CA (US)

(73) Assignee: Salesforce, Inc.

( * ) Notice: Subject to any disclaimer, the term of this patent is extended or adjusted under 35 U.S.C. 154(b) by 208 days.

(21) Appl. No.: 18/470,198

(22) Filed: Sep. 19, 2023

(65) Prior Publication Data

US 2025/0097215 A1    Mar. 20, 2025

(51) Int. Cl.
*H04L 9/40* (2022.01)

(52) U.S. Cl.
CPC ............ *H04L 63/083* (2013.01); *H04L 63/10* (2013.01)

(58) Field of Classification Search
CPC ............................ H04L 63/083; H04L 63/10
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |

(Continued)

*Primary Examiner* — Chau Le
(74) *Attorney, Agent, or Firm* — Ingrassia Fisher & Lorenz, LLP

(57) ABSTRACT

A method and system for generating a digital access token consumable by a piggy-back service system has been developed. A request for a digital access token for a client is received. The digital access token is associated with a tenant. At least one standard claim associated with a client attribute of the client is generated. The digital access token includes a header, a payload, and a signature. The payload includes the at least one standard claim associated with the client attribute. The digital access token enables the piggy-back service system to independently authorize access by the client to at least one service at the piggy-back service system based on the at least one standard claim. The digital access token is transmitted to a first device associated with the client.

20 Claims, 7 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,716,325 B2 * | 8/2023 | Smolny ............... H04L 63/20 726/1 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0294426 A1 * | 12/2007 | Huang ............... H04L 1/1614 709/234 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2021/0409400 A1 * | 12/2021 | Palanisamy ......... H04L 67/12 |
| 2023/0351030 A1 * | 11/2023 | Wang ............... H04L 63/0807 |

* cited by examiner

SYSTEMS AND METHODS FOR GENERATING DIGITAL ACCESS TOKENS INDEPENDENTLY COMSUMABLE BY A PIGGY-BACK SERVICE SYSTEM

TECHNICAL FIELD

Embodiments of the subject matter described herein relate generally to digital access tokens and more particularly, embodiments of the subject matter relate to systems and methods for generating digital access tokens independently consumable by a piggy-back service system.

BACKGROUND

When a client seeks access to a web-based application affiliated with a multi-tenant service, the client typically issues a request for a digital access token to a token issuing system associated with that multi-tenant service. The token issuing system authenticates the client and issues a digital access token to the client. The client uses the digital access token to gain access to services provided by the multi-tenant service via the web-application. In some architectures, services "piggy-back" off the token issuing system. Such services are rendered by piggy-back service systems. The client can access the services provided by the piggy-back service systems using the digital access token provided by the token issuing system.

In some cases, the digital access tokens are opaque randomly generated strings that can only be interpreted by the token issuing system. When the client transmits the digital access token to a piggy-back service system the piggy-back service system typically issues a request to the token issuing system to validate the digital access token. The piggy-back service system cannot begin to process a service request from the client until the token issuing system has validated the digital access token provided by the client.

In some cases, the token issuing system issues digital access tokens that are JavaScript Object Notation (JSON) Web Tokens. The token issuing system uses a standardized signature mechanism that employs a private key to generate a signature in the JSON Web Token. The same private key is used to generate all of the signatures for the multi-tenant service. The multi-tenant service typically publishes the public key associated with the private key at a public key endpoint. Upon the receipt of JSON Web Token from the client, the piggy-back service system fetches the public key to authenticate the JSON Web Token. The use of a single key pair by the token issuing system may render the multi-tenant service vulnerable to breaches if the private key is compromised.

While opaque digital access tokens and JSON Web Tokens facilitate the authentication process, separate mechanisms are typically employed by the piggy-back service system to determine and enforce authorizations associated with client access to services at the piggy-back service system. These mechanisms often involve interactions between the piggy-back service system and the token issuing system.

Accordingly, there is a need in the art for methods and systems for generating digital access tokens independently consumable by a piggy-back service system such that the digital access token enables the piggy-back service system implement a secure digital access token validation process as well as enforce authorizations associated with client access to services at the piggy-back service system without the need to contact the authentication system. In addition, there may be reasons such as piggy-back service system or token issuing system scalability, as such piggy-back service systems may be unable to constantly query the token issuing system for digital access token validation or for authentication enforcement.

BRIEF DESCRIPTION OF THE DRAWINGS

The present disclosure will hereinafter be described in conjunction with the following drawing figures, wherein like numerals denote like elements, and wherein.

DETAILED DESCRIPTION

A token issuing system includes a digital access token generation system. The token issuing system issues tokens for a multi-tenant service. The multi-tenant service includes a plurality of tenants. When a client requests a digital access token associated with a tenant from the token issuing system, the token issuing system authenticates the client. Upon authentication of the client, the digital access token generation system generates the digital access token for transmission to the client. The digital access token includes a header, a payload, and a signature. The header includes a digital token type. The digital token type defines a format and a version of the digital access token. The payload includes standard claims including standard claims that are associated with client attributes in the payload. The client attributes include, but are not limited to, a tenant identifier for the tenant that is associated with the digital access token, a role with respect to the tenant, tenant level access provided to the client by the tenant, and an identify type. A tenant specific key pair is associated with each of the tenants in the multi-tenant service. The digital access token generation system generates the signature based on the header and payload using a tenant specific private key and publishes a tenant specific public key at a public key endpoint system. In various embodiments, the digital access token is a tenant specific JavaScript Object Notation (JSON) Web Token that includes additional standard claims.

A piggy-back service system offers piggy-back services. When the client seeks to use one or more services at the piggy-back service system, the client transmits the digital access token to the piggy-back service system. The piggy-back service system processes the digital access token in accordance with the digital token type in the header. The piggy-back service system uses the tenant identifier in the payload to identify the tenant, retrieve the tenant specific public key from the public key endpoint system, and validate the digital access token. The piggy-back service system uses the role with respect to the tenant, the tenant level access provided to the client by the tenant, and the identity type to authorize permissions associated with access by the client to one or more services at the piggy-back service system. The piggy-back service system is able to validate the digital access token and authorize the permissions associated with client access to the one or more services without the need to request additional information from the token issuing system.

Figure 1:
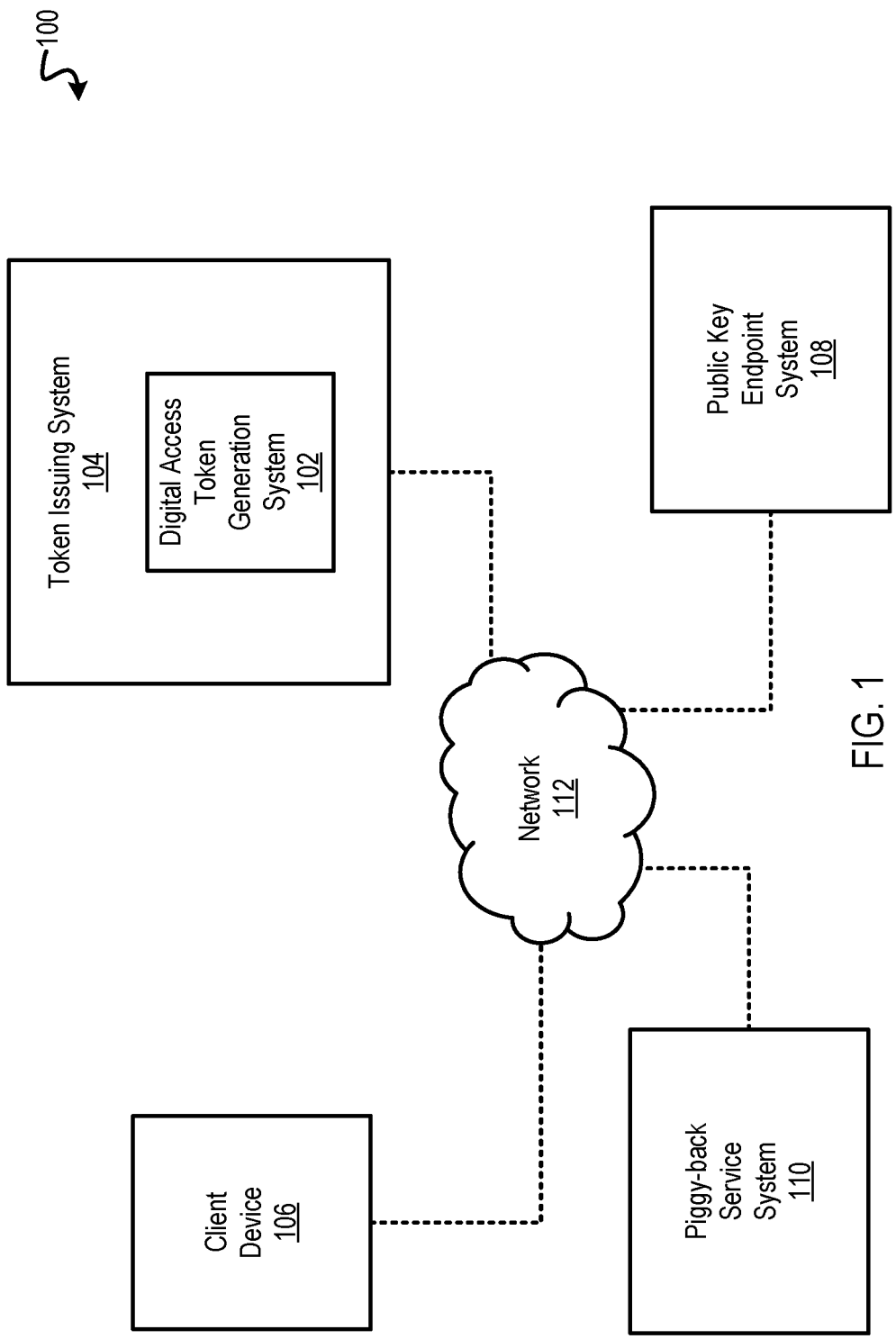
FIG. 1 is a block diagram representation of a system including a digital access token generation system in accordance with at least one embodiment.

Referring to FIG. 1, a block diagram representation of a system 100 including a digital access token generation system 102 in accordance with at least one embodiment is shown. It should be appreciated that FIG. 1 depicts a simplified representation of the system 100 for purposes of explanation and is not intended to be limiting. The system 100 includes a token issuing system 104, a client device 106, a public key endpoint system 108, and a piggy-back service system 110. The token issuing system 104 includes the digital access token generation system 102. The system 100 may include additional components that facilitate operation of the system 100.

The token issuing system 104 includes the digital access token generation system 102. In various embodiments, the token issuing system 104 issues digital access tokens for multiple tenants at a multi-tenant service. In various embodiments, the token issuing system 104 is a tenant specific token issuing system 104 and issues digital access tokens for a specific tenant of a multi-tenant service. The token issuing system 104 is configured to communicate with the public key endpoint system 108 via a network 112.

The client device 106 is configured to communicate with the token issuing system 104 and the piggy-back service system 110 via the network 112. The client device 106 is used by a client to request a digital access token from the token issuing system 104 and to use the received digital access token to request access to one or more services at the piggy-back service system 110. The digital access token is affiliated with a tenant. The digital access token enables the client with access to data on behalf of the tenant. While a single client device 106 is shown, the system 100 typically includes a plurality of client devices 106.

The digital access token includes a header, a payload, and a signature. The digital access token generation system 102 is configured to generate the signature based on the header and the payload. In various embodiments, each tenant in the multi-tenant service is associated with a tenant specific private/public key pair. The request for the digital access token is affiliated with a tenant. The digital access token generation system 102 is configured to generate the signature using the tenant specific private key for that tenant. The tenant specific public keys for each of the tenants are published at the public key endpoint system 108. In various embodiments, the token issuing system 104 generates the tenant specific private/public key pairs. The token issuing system 104 publishes the tenant specific public keys at the public key endpoint system 108. The public key endpoint system 108 is configured to communicate with the token issuing system 104 and with the piggy-back service system 110 via the network 112.

The digital access token generation system 102 is configured to generate the digital access token responsive to a request for the digital access token received from the client via the client device 106. The request is for the digital access token associated with the tenant. The payload of the digital access token includes standard claims. The digital access token generation system 102 is configured to generate standard claims including standard claims that are associated with client attributes for inclusion in the payload. Examples of the client attributes used to generate the standard claims associated with client attributes, include but are not limited to, a tenant identifier of the tenant associated with the digital access token, a role with respect to the tenant, tenant level access provided by the tenant to the client, and an identity type. The identity type is an identity type that the client acts as, such as a specific user in a tenant. In various embodiments, the digital access token generation system 102 is configured to generate a digital token type for inclusion in the header. The digital token type defines the format and a version of the digital access token.

In various embodiments, the administrator for each of the different tenants in the multi-tenant service is provided with the option of providing tenant specific token settings for the digital access tokens issued to clients associated with that tenant to the digital access token generation system 102. When the digital access token generation system 102 receives the request for the digital access token from the client, the digital access token generation system 102 is configured to identify any tenant specific token settings for the tenant associated with the digital access token. The digital access token generation system 102 is configured to enable the identified tenant specific token setting(s) of the digital access token prior to the transmission of the digital access token to the client device 106.

The piggy-back service system 110 is configured to provide services that piggy-back off a tenant of the multi-tenant service. The piggy-back service system 110 is configured to communicate with the public key endpoint system 108 via the network 112. When the client seeks to use one or more services offered by the piggy-back service system 110, the client transmits the digital access token from the client device 106 to the piggy-back service system 110. The piggy-back service system 110 is configured to independently validate the received digital access token and authorize access by the client to one or more services at the piggy-back service system 110 without the need to contact the token issuing system 104. The data that the piggy-back service system 110 needs validate the digital access token and to authorize access to one or more services at the piggy-back service system 110 are contained in the digital access token. In at least one embodiment, the piggy-back service system 110 is associated with the token issuing system 104. In at least one embodiment, the piggy-back service system 110 is associated with an independent software vendor (ISV) working with the token issuing system 104 and/or the engineers associated with the token issuing system 104. In at least one embodiment, the piggy-back service system 110 is unaffiliated with the multi-tenant service. Any entity including developers associated with an organization that owns the tenant associated with the request for the digital access token may develop their own piggy-back service for implementation at their own piggy-back service system 110 using one or more of the disclosed systems and methods associated with the implementation of the systems.

In various embodiments, piggy-back service system 110 is configured to identify the digital token type in the header of the received digital access token. The piggy-back service system 110 is configured to process the digital access token in accordance with the digital token type. In various embodiments, one of the standard claims includes the tenant identifier for the tenant associated with the digital access token. The piggy-back service system 110 is configured to retrieve the tenant specific public key for the tenant identified by the tenant identifier from the public key endpoint system 108. The piggy-back service system 110 is configured to use the retrieved tenant specific public key to validate the signature in the received digital access token. In various embodiments, the client attributes defined by the associated standard claims in the payload of the digital access token are used by the piggy-back service system 110 to determine the level of access to allow the client to the service(s) provided by the piggy-back service system 110. While a single piggy-back service system 110 is shown, the system 100 may include more than one piggy-back service system 110. While the token issuing system 104, the client device 106, the public key endpoint system 108, and the piggy-back service system 110 are shown as establishing communication channels via a single network 112, one or more of the token issuing system 104, the client device 106, the public key endpoint system 108, and the piggy-back service system 110 may establish communication channels via multiple networks.

Figure 2:
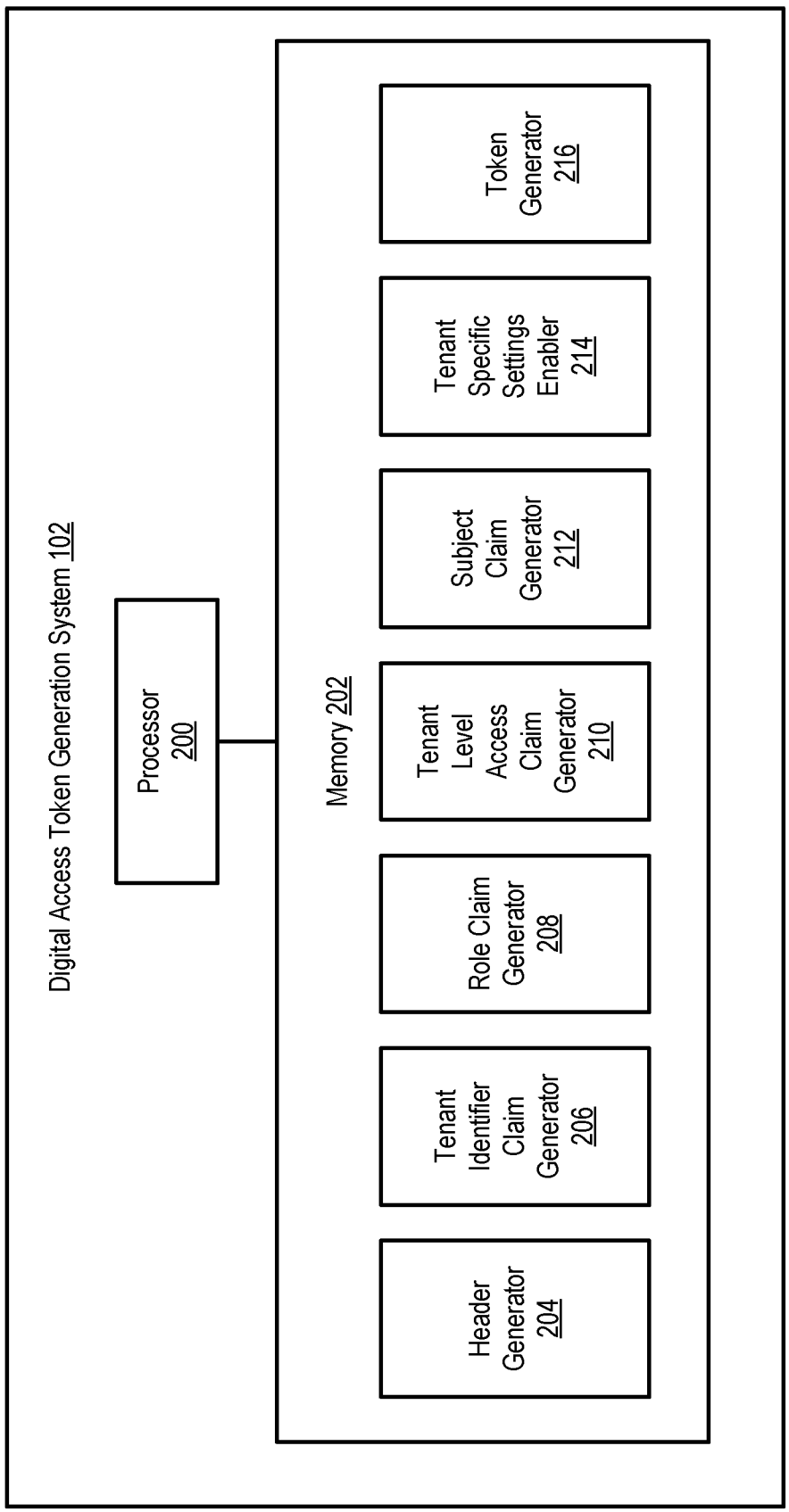
FIG. 2 is a block diagram representation of a digital access token generation system in accordance with at least one embodiment.

Referring to FIG. 2, a block diagram representation of a digital access token generation system 102 in accordance with at least one embodiment is shown. The digital access token generation system 102 includes at least one processor 200 and at least one memory 202. The at least one memory 202 is at least one non-transitory machine-readable storage medium that stores instructions configurable to be executed by the at least one processor 200. The at least one memory 202 includes a header generator 204, a tenant identifier claim generator 206, a role claim generator 208, a tenant level access claim generator 210, a subject claim generator 212, a tenant specific settings enabler 214, and a token generator 216. The digital access token generation system 102 may include additional components that facilitate operation of the digital access token generation system 102. It should be appreciated that FIG. 2 depicts a simplified representation of the digital access token generation system 102 for purposes of explanation and is not intended to be limiting.

Figure 3:
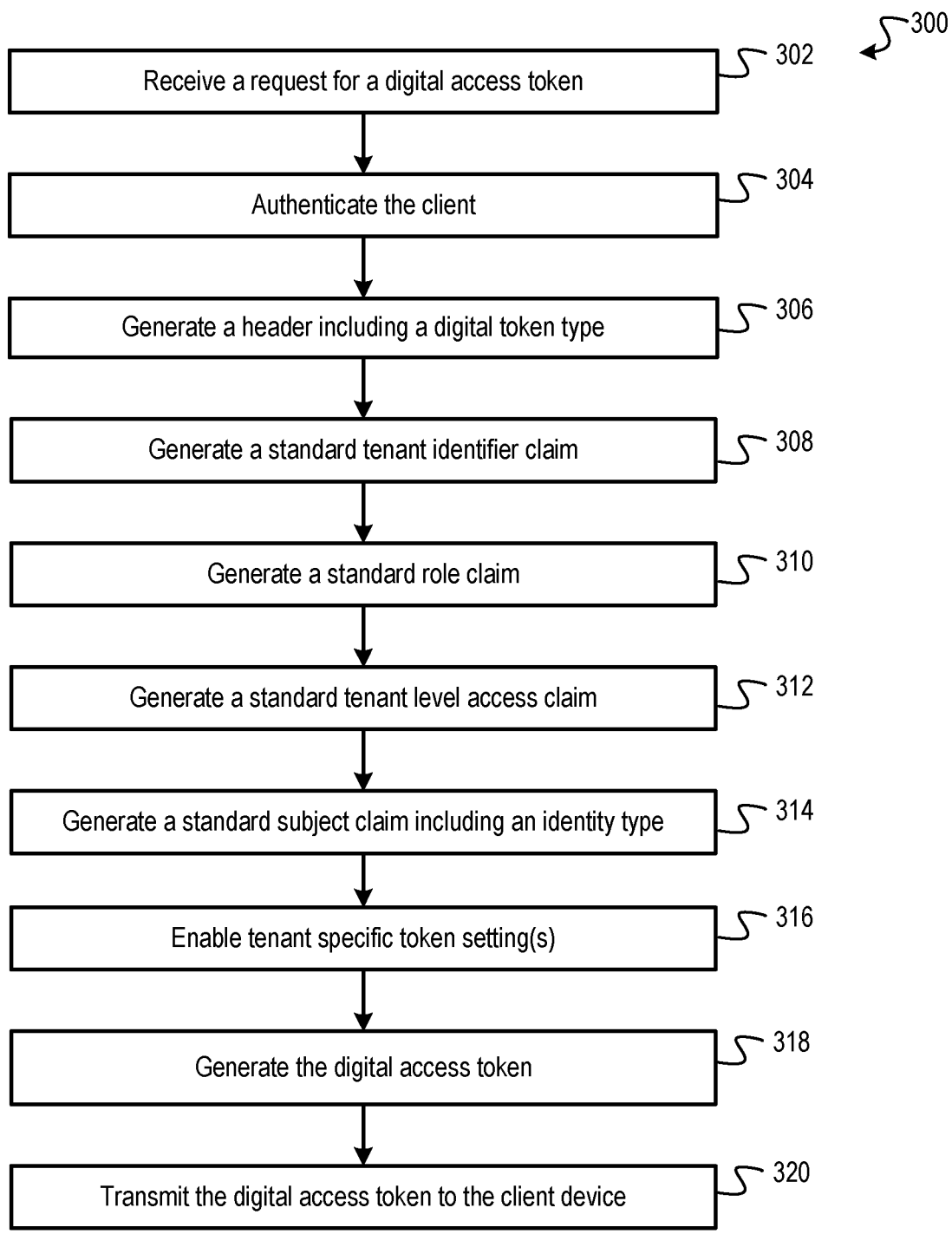
FIG. 3 is a flowchart representation of an exemplary method of generating digital access tokens that are independently consumable by a piggy-back service system in accordance with at least one embodiment.

Referring to FIG. 3, a flowchart representation of an exemplary method 300 of generating digital access tokens in accordance with at least one embodiment is shown. The method 300 will be described with reference to an exemplary implementation of a token issuing system 104 including a digital access token generation system 102. As can be appreciated in light of the disclosure, the order of operation within the method 300 is not limited to the sequential execution as illustrated in FIG. 3 but may be performed in one or more varying orders as applicable and in accordance with the present disclosure.

At 302, a request for a digital access token associated with a tenant is received. In at least one embodiment, the request for the digital access token is received at the token issuing system 104. In at least one embodiment, the request for the digital access token is received from a client device 106 of the client. The token issuing system 104 acts on behalf of a tenant within the multi-tenant service and issues the digital access token to enable the client to access data on behalf of the tenant.

At 304, the token issuing system 104 authenticates the client. In at least one embodiment, the token issuing system 104 receives a username and password from the client via the client device 106. The token issuing system 104 authenticates the client based on the received username and password. In at least one embodiment, the client uses an open authentication protocol to enable authentication. An example of an open authentication protocol is OAuth 2.0.

At 306, the digital access token generation system 102 generates a header including a digital token type for the digital access token. In various embodiments, the header generator 204 generates the header including the digital token type for the digital access token. The digital token type defines the format and the version of the digital access token. The inclusion of the digital token type in the header of the digital access token enables a piggy-back service system 110 to distinguish between different types of digital access tokens without complicated logic to check for the presence of specific claims in the payload.

In at least one embodiment, the digital token type issued by the digital access token generation system 102 is a tenant specific JSON Web Token. The digital token type specifies that the digital access token is a tenant specific JSON Web Token with additional standard claims. The token issuing system 104 may issue different types of JSON Web Tokens. The digital token type in the header may be used to distinguish between different types of JSON Web Tokens internally at the tenant and may be used to version the digital access token in the future if breaking changes are needed. The header includes additional fields that are included in a typical JSON Web Token.

At 308, a standard tenant identifier claim is generated. The tenant identifier is an identifier for the tenant associated with the digital access token. In at least one embodiment, the digital access token generation system 102 generates the standard tenant identifier claim. In at least one embodiment, the tenant identifier claim generator 206 generates the standard tenant identifier claim. The tenant identifier is a client attribute. The generated standard tenant identifier claim includes the tenant identifier. The standard tenant identifier claim is included in the payload of the digital access token. In at least one embodiment, the digital access token is a tenant specific JSON Web Token and the standard tenant identifier claim is included the payload of the tenant specific JSON Web Token. The inclusion of the standard tenant identifier claim in the digital access token enables the piggy-back service system 110 to identify the tenant associated with the digital access token.

At 310, a standard role claim is generated. In at least one embodiment, the digital access token generation system 102 generates the standard role claim. In at least one embodiment, the role claim generator 208 generates the standard role claim. The role may be a role of the client with respect to the tenant. The role may be associated with a user or a token subject. The role is a client attribute. An example of a role of the client is a web support agent. The standard role claim is included in the payload of the digital access token. In at least one embodiment, the digital access token is a tenant specific JSON Web Token and the standard role claim is included the payload of the tenant specific JSON Web Token. The inclusion of the standard role claim in the digital access token enables the piggy-back service system 110 to authorize permissions associated with access by the client to one or more services at the piggy-back service system 110 based on the role. The standard role claim can be read and validated by the piggy-back service system 110 to control access to services at the piggy-back service system 110 at any desired level of granularity.

In at least one embodiment, engineering teams for the token issuing system 104 create a role claim digital token scope handler. The role claim digital token scope handler is tied to a role claim open authorization scope that allows the injection of new values into the into the standard role claim. An example of an open authorization scope is an OAuth scope.

At 312, a standard tenant level access claim including tenant level access provided to the client by the tenant is generated. In at least one embodiment, the digital access token generation system 102 generates the standard tenant level access claim. In at least one embodiment, the tenant level access claim generator 210 generates the standard tenant level access claim. The tenant provides tenant level access to the client. The tenant level access provided to the client by the tenant is a client attribute. In various embodiments, the tenant level access provided to the client is based on services that the client has purchased from the tenant. For example, the client may purchase access to a commerce cloud and a marketing cloud. The tenant level access provided to the client is access to the commerce cloud and the marketing cloud. The standard tenant level access claim is included in the payload of the digital access token. In at least one embodiment, the digital access token is a tenant specific JSON Web Token and standard tenant level access claim is included the payload of the tenant specific JSON Web Token. The inclusion of the standard tenant level access claim in the digital access token enables the piggy-back service system 110 to authorize permissions associated with access by the client to one or more services at the piggy-back service system 110 based on the tenant level access provided to the client. The standard tenant level access claim can be read and validated by the piggy-back service system 110 to control access to services at the piggy-back service system 110 at any desired level of granularity.

In at least one embodiment, engineering teams for the token issuing system 104 create a tenant level access claim digital token scope handler. The tenant level access claim digital token scope handler is tied to a tenant level access claim open authorization scope that allows the injection of new values into the into the standard tenant level access claim. An example of an open authorization scope is an OAuth scope.

At 314, a standard subject claim including an identity type is generated. In at least one embodiment, the digital access token generation system 102 generates the standard subject claim including the identity type. In at least one embodiment, the subject claim generator 212 generates the standard subject claim including the identity type. The identity type is a client attribute. Examples of identity type, include but are not limited to, specific types of users and unauthenticated guest users to services of the tenant acting on their own behalf. The identify type can be a client or some other identity that the client acts on behalf of, such as a user in the tenant associated with the digital access token.

The standard subject claim including the identify type is included in the payload of the digital access token. The inclusion of the identity type in the digital access token enables the piggy-back service system 110 to authorize permissions associated with access by the client to one or more services at the piggy-back service system 110 based on the identity type. The standard subject claim including the identify type can be read and validated by the piggy-back service system 110 to control access to services at the piggy-back service system 110 at any desired level of granularity.

In at least one embodiment, engineering teams for the token issuing system 104 create a subject claim digital token cope handler. The subject claim digital token cope handler is tied to a subject claim open authorization scope that allows the injection of new values into the into the standard subject claim. An example of an open authorization scope is an OAuth scope.

An example of a digital access token is a tenant specific JSON Web Token. JSON Web Tokens include a standard subject claim that specifies the identity of the client that the digital access token represents. In at least one embodiment, the tenant specific JSON Web Token includes a prefixed value that indicates the identity type. The prefixed value is appended to the identity of the client to generate the standard subject claim. This prefix mechanism enables the piggy-back service system 110 to exclude broad categories of access (for example, exclude unauthenticated guest user access) without having to employ complicated look-ups on the actual identity of the client. The use of a prefix defining the identity type appended to the identity of the client enables the use of standard JSON Web Token libraries that are configured to interpret the identity of the client as a subject claim and can be used without custom parsing logic.

At 316, tenant specific token setting(s) associated digital access token are enabled. In at least one embodiment, the digital access token generation system 102 enables the tenant specific token setting(s) associated with the digital access token. In at least one embodiment, the tenant specific settings enabler 216 enables the tenant specific token setting(s) associated with the digital access token. An administrator for each of the different tenants of the multi-tenant service is provided with the option of providing tenant specific token settings for the digital access tokens issued to clients on behalf of that tenant to the digital access token generation system 102. Any tenant specific token settings for the tenant associated with the digital access token are identified. The identified tenant specific token setting(s) associated with the digital access token are enabled. In various embodiments, the digital access token is a tenant specific JSON Web Token. The tenant specific token setting(s) for the tenant specific JSON Web Token setting(s) are enabled before the tenant specific JSON Web Token is issued through OAuth flows for a given tenant. The use of tenant specific token setting(s) enable the administrator to change, for example, token expiration times to mitigate token loss or theft. A mechanism can also be provided to rotate out the tenant specific private/public key pairs, effectively invalidating all issued digital access tokens for a tenant.

At 318, the digital access token is generated. In at least one embodiment, the digital access token generation system 102 generates the digital access token. In at least one embodiment, the token generator 214 generates the digital access token. In at least one embodiment, the digital access token is a tenant specific JSON Web Token. The digital access token includes the header, the payload, and the signature. The generated digital access token includes the header generated at 306. The payload includes a plurality of standard claims. The plurality of standard claims include the standard claims that are associated with the client attributes in addition to other standard claims that are typically included in digital access tokens. The generated payload included the standard claims that are associated with the client attributes generated at 308, 310, 312, and 314. The signature is generated based on the header and the payload.

Each tenant in the multi-tenant service is associated with a tenant specific private/public key pair. The signature is generated using the tenant specific private key for the tenant associated with the digital access token. The tenant specific public keys for each of the tenants are published at the public key endpoint system 108.

At 320, the digital access token is transmitted to the client device 106 associated with the client. In at least one embodiment, the digital access token generation system 102 transmits the digital access token to the client device 106 associated with the client. The client can use the digital access token to access services at the piggy-back service systems 110.

The token issuing system 104 and the public key endpoint 108 are not specific to a tenant. They are services shared across tenants within an application server. In various embodiments, the token issuing system 104 issues digital access tokens for multiple tenants at a multi-tenant service. In various embodiments, the token issuing system 104 is a tenant specific token issuing system 104 and issues digital access tokens for a specific tenant of a multi-tenant service.

Figure 4:
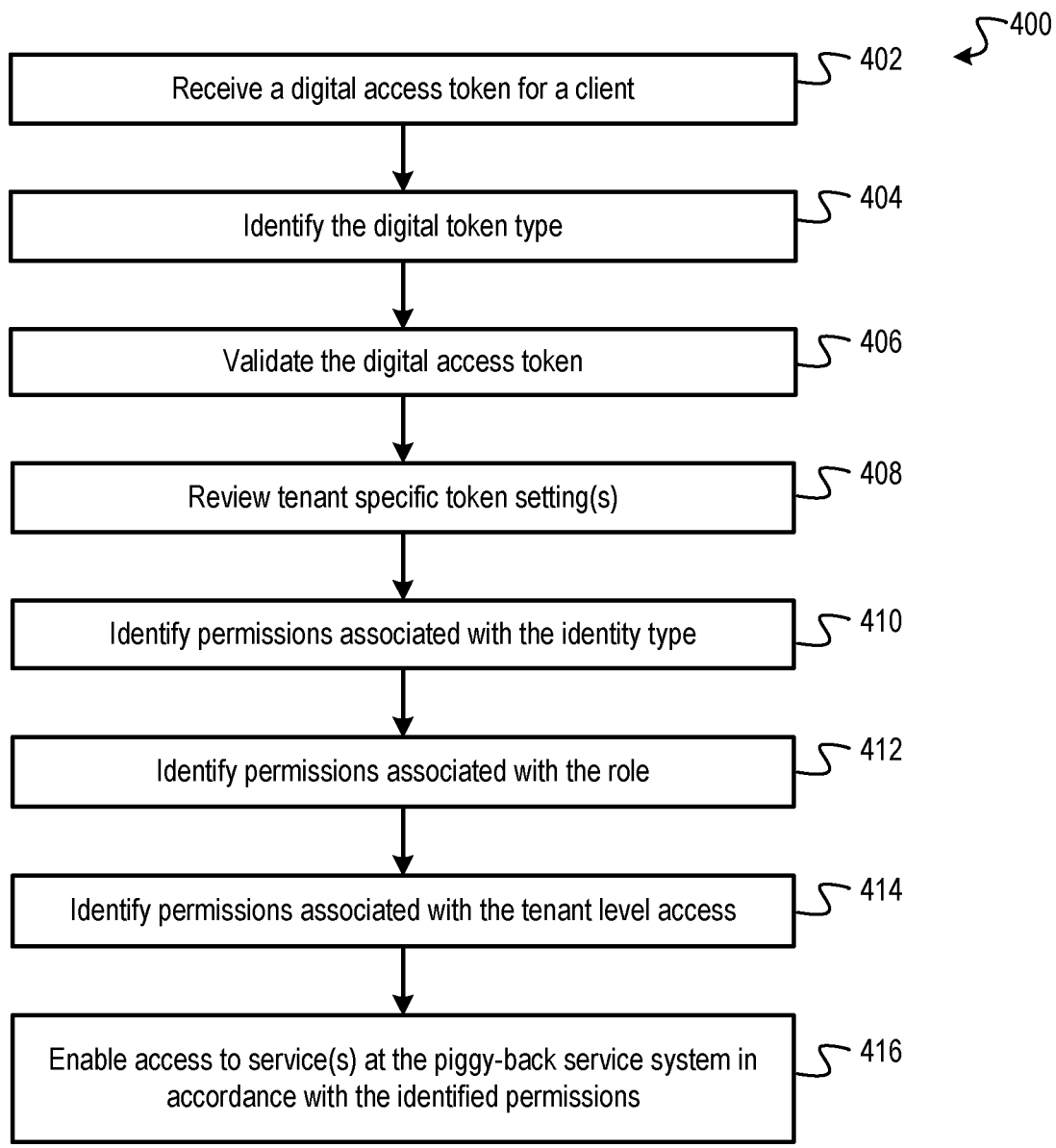
FIG. 4 is a flowchart representation of an exemplary method of a piggy-back service system independently consuming a digital access token in accordance with at least one embodiment.

Referring to FIG. 4, is a flowchart representation of an exemplary method 400 of authorizing access to one or more services at a piggy-back service system 110 in accordance with at least one embodiment is shown. The method 400 will be described with reference to an exemplary implementation of a piggy-back service system 110. The piggy-back service system 110 includes at least one processor and at least one memory. The at least one memory is at least one non-transitory machine-readable storage medium that stores instructions configurable to be executed by the at least one processor. As can be appreciated in light of the disclosure, the order of operation within the method 400 is not limited to the sequential execution as illustrated in FIG. 4 but may be performed in one or more varying orders as applicable and in accordance with the present disclosure.

At 402, a digital access token for a client is received at the piggy-back service system 110. At 404, the piggy-back service system 110 identifies the digital token type of the digital access token. The header of the digital access token includes the digital token type. The piggy-back service system 110 identifies the digital token type based on the digital token type included in the header. The digital token type defines the format and the version of the digital access token and enables the piggy-back service system 110 to process the digital access token accordingly. The inclusion of the digital token type in the header of the digital access token enables the piggy-back service system 110 to distinguish between different types of digital access tokens without complicated logic to check for the presence of specific claims in the payload. In at least one embodiment, the digital token type of the digital access token is a tenant specific JSON Web Token. The piggy-back service system 110 may receive different types of JSON Web Tokens. The digital token type in the header is used by the piggy-back service system 110 to distinguish between the different types of JSON Web Tokens.

At 406, the piggy-back service system 110 validates the digital access token. The payload includes a standard tenant identifier claim. The standard tenant identifier claim includes the tenant identifier. The tenant identifier is the tenant that is associated with the digital access token. The tenant identifier is a client attribute. The piggy-back service system 110 uses the tenant identifier to identify the tenant and retrieve the tenant specific public key associated with the identified tenant from the public key endpoint system 108. The piggy-back service system 110 uses the retrieved tenant specific public key to validate the signature of the digital access token thereby validating the digital access token. In at least one embodiment, the digital access token is a tenant specific JSON Web Token and the standard tenant identifier claim is included the payload of the tenant specific JSON Web Token.

At 408, the piggy-back service system 110 reviews tenant specific token setting(s) that have been enabled for the digital access token. The piggy-back service system 110 determines whether the digital access token is still valid based on the tenant specific token setting(s). The tenant specific token setting may, for example, specify an expiration time for the digital access token. The piggy-back service system 110 reviews the expiration time for the digital access token to determine whether the digital access token is still valid. If the piggy-back service system 110 determines that the digital access token is still valid, the piggy-back service system 110 continues to process the digital access token. If the piggy-back service system 110 determines that the digital access token is invalid, the piggy-back service system 110 rejects the digital access token and denies access to services at the piggy-back service system 110. In at least one embodiment, the digital access token is a tenant specific JSON Web Token and the tenant specific token setting(s) have been enabled for the tenant specific JSON Web Token.

At 410, the piggy-back service system 110 identifies permissions associated with the identify type. The payload includes a standard subject claim. The standard subject claim includes an identity of the client and an identity type. The identity type is a client attribute. Examples of identity type, include but are not limited to, specific types of users and unauthenticated guest users to services of the tenant acting on their own behalf. The identify type can be a client or some other identity that the client acts on behalf of, such as a user in the tenant associated with the digital access token. The piggy-back service system 110 uses the identity type to authorize permissions associated with access by the client to one or more services at the piggy-back service system 110. The piggy-back service system 110 can read and validate the standard subject claim to control access to services at the piggy-back service system 110 at any desired level of granularity.

An example of a digital access token is a tenant specific JSON Web Token. JSON Web Tokens include a standard subject claim that specifies the identity of the client that the digital access token represents. In at least one embodiment, the tenant specific JSON Web Token includes a prefixed value that indicates the identity type. The prefixed value is appended to the identity of the client to generate the standard subject claim. The piggy-back service system 110 uses the prefix mechanism to exclude broad categories of access (for example, exclude unauthenticated guest user access) without having to employ complicated look-ups on the actual identity of the client. The use of a prefix defining the identity type appended to the identity of the client enables the use of standard JSON Web Token libraries that are configured to interpret the identity of the client as a subject claim and can be used without custom parsing logic.

At 412, the piggy-back service system 110 identifies permissions associated with the role. The payload includes a standard role claim. The standard role claim includes a role with respect to the tenant. The role is a client attribute. The role may be a role of the client with respect to the tenant. The role may be associated with a user or a token subject. An example of a role of the client is a web support agent. The piggy-back service system 110 authorizes permissions associated with access by the client to one or more services at the piggy-back service system 110 based on the role. The standard role claim can be read and validated by the piggy-back service system 110 to control access to services at the piggy-back service system 110 at any desired level of granularity. For example, the piggy-back service system 110 may provide a web support agent with access to certain services while denying access to other services at the piggy-back service system 110 based on the role being a web support agent. In at least one embodiment, the digital access token is a tenant specific JSON Web Token and the standard role claim is included the payload of the tenant specific JSON Web Token.

At 414, the piggy-back service system 110 identifies permissions associated with the tenant level access provided to the client by the tenant. The payload includes a standard tenant level access claim. The standard tenant level access claim includes tenant level access provided to the client by the tenant. The tenant level access provided to the client is a client attribute.

In various embodiments, the tenant level access provided to the client is based on services that the client has purchased from the tenant. For example, the client may have purchased access to a commerce cloud and a marketing cloud. The tenant level access provided to the client at the tenant is access to the commerce cloud and the marketing cloud. The inclusion of the standard tenant level access claim in the digital access token enables the piggy-back service system 110 to authorize permissions associated with access by the client to one or more services at the piggy-back service system 110 based on the tenant level access provided to the client. The standard tenant level access claim can be read and validated by the piggy-back service system 110 to control access to services at the piggy-back service system 110 at any desired level of granularity. For example, the piggy-back service system 110 may provide a client that has purchased the commerce cloud and the marketing cloud with access to certain services while denying access to other services at the piggy-back service system 110. In at least one embodiment, the digital access token is a tenant specific JSON Web Token and the standard tenant level access claim is included the payload of the tenant specific JSON Web Token.

At 416, the piggy-back service system 110 enables access to one of more services at the piggy-back service system 110 in accordance with the identified permissions. The piggy-back service system 110 identifies the permissions associated with client access to the one or more services at the piggy-back service system 110 at 410, 412, and 414. The piggy-back service system authorizes access to the one or more services at the piggy-back service system 110 in accordance with the identified permissions. The piggy-back service system 110 is able to validate the digital access token and authorize the permissions associated with client access to the one or more services at the piggy-back service system 110 without the need to request additional information from the token issuing system.

Figure 5:
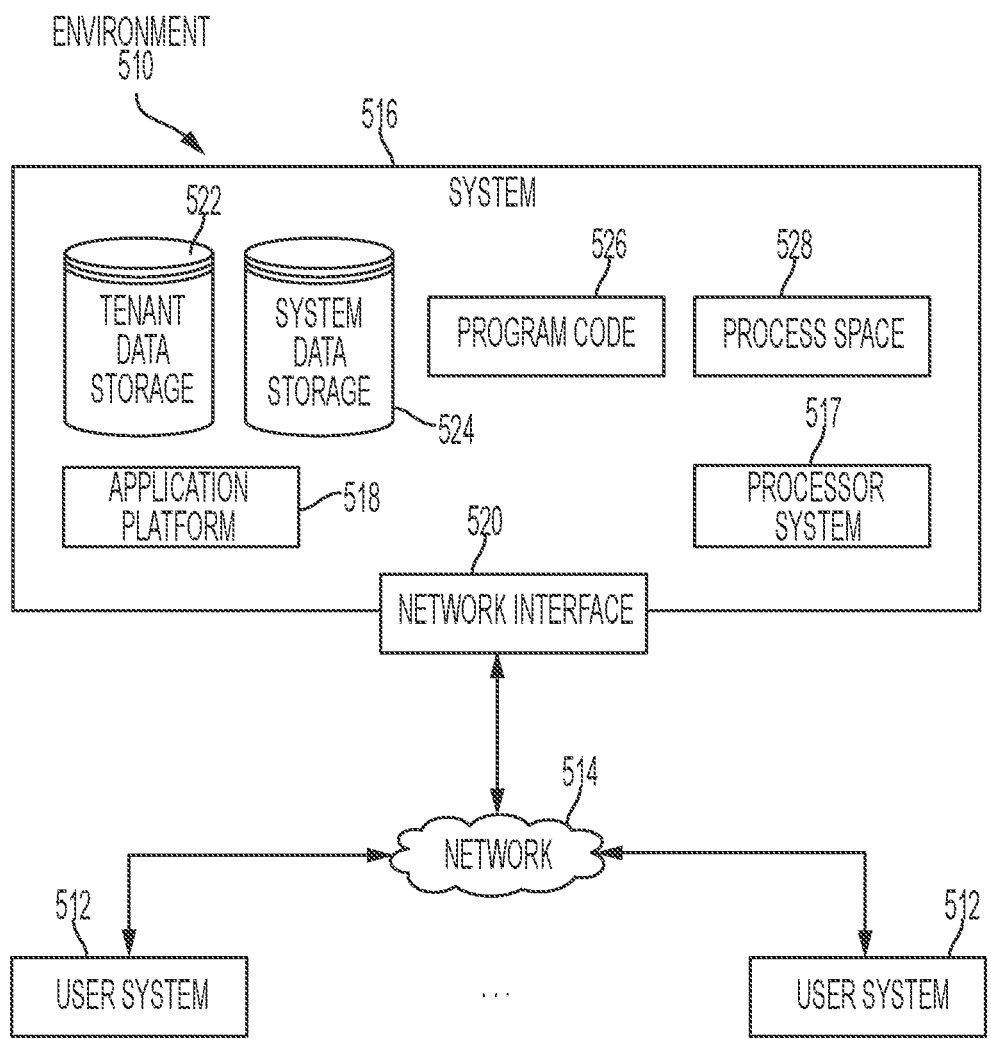
FIG. 5 is a block diagram representation of an example of an environment in which an on-demand database service can be used in accordance with some implementations.

FIG. 5 shows a block diagram of an example of an environment 510 in which an on-demand database service can be used in accordance with some implementations. The environment 510 includes user systems 512 (also referred to a client device), a network 514, a database system 516 (also referred to herein as a "cloud-based system"), a processor system 517, an application platform 518, a network interface 520, tenant database 522 for storing tenant data 523, system database 524 for storing system data 525, program code 526 for implementing various functions of the system 516, and process space 528 for executing database system processes and tenant-specific processes, such as running applications as part of an application hosting service. In some other implementations, environment 510 may not have all of these components or systems, or may have other components or systems instead of, or in addition to, those listed above.

In some implementations, the environment 510 is an environment in which an on-demand database service exists. An on-demand database service, such as that which can be implemented using the system 516, is a service that is made available to users outside of the enterprise(s) that own, maintain or provide access to the system 516. As described above, such users generally do not need to be concerned with building or maintaining the system 516. Instead, resources provided by the system 516 may be available for such users' use when the users need services provided by the system 516; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 518 can be a framework that allows the applications of system 516 to execute, such as the hardware or software infrastructure of the system 516. In some implementations, the application platform 518 enables the creation, management and execution of one or more applications developed by the provider of the on-demand database service, users accessing the on-demand database service via user systems 512, or third-party application users accessing the on-demand database service via user systems 512.

In some implementations, the system 516 implements a web-based customer relationship management (CRM) system. For example, in some such implementations, the system 516 includes application servers configured to implement and execute CRM software applications as well as provide related data, code, forms, renderable webpages and documents and other information to and from user systems 512 and to store to, and retrieve from, a database system related data, objects, and Webpage content. In some MTS implementations, data for multiple tenants may be stored in the same physical database object in tenant database 522. In some such implementations, tenant data is arranged in the storage medium(s) of tenant database 522 so that data of one tenant is kept logically separate from that of other tenants so that one tenant does not have access to another tenant's data, unless such data is expressly shared. The system 516 also implements applications other than, or in addition to, a CRM application. For example, the system 516 can provide tenant access to multiple hosted (standard and custom) applications, including a CRM application. User (or third-party user) applications, which may or may not include CRM, may be supported by the application platform 518. The application platform 518 manages the creation and storage of the applications into one or more database objects and the execution of the applications in one or more virtual machines in the process space of the system 516.

According to some implementations, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 514 can be or include any network or combination of networks of systems or devices that communicate with one another. For example, the network 514 can be or include any one or any combination of a LAN (local area network), WAN (wide area network), telephone network, wireless network, cellular network, point-to-point network, star network, token ring network, hub network, or other appropriate configuration. The network 514 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 512 can communicate with system 516 using TCP/IP and, at a higher network level, other common Internet protocols to communicate, such as HTTP, FTP, AFS, WAP, etc. In an example where HTTP is used, each user system 512 can include an HTTP client commonly referred to as a "web browser" or simply a "browser" for sending and receiving HTTP signals to and from an HTTP server of the system 516. Such an HTTP server can be implemented as the sole network interface 520 between the system 516 and the network 514, but other techniques can be used in addition to or instead of these techniques. In some implementations, the network interface 520 between the system 516 and the network 514 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 512 can be implemented as any computing device(s) or other data processing apparatus or systems usable by users to access the database system 516. For example, any of user systems 512 can be a desktop computer, a workstation, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 512 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 516) of the user system 512 to access, process and view information, pages and applications available to it from the system 516 over the network 514.

Each user system 512 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 512 in conjunction with pages, forms, applications and other information provided by the system 516 or other systems or servers. For example, the user interface device can be used to access data and applications hosted by system 516, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 512 may differ in their respective capacities, and the capacity of a particular user system 512 can be entirely determined by permissions (permission levels) for the current user of such user system. For example, where a salesperson is using a particular user system 512 to interact with the system 516, that user system can have the capacities allotted to the salesperson. However, while an administrator is using that user system 512 to interact with the system 516, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 512 and some or all of its components are operator-configurable using applications, such as a browser, including computer code executed using a central processing unit (CPU) such as an Intel Pentium® processor or the like. Similarly, the system 516 (and additional instances of an MTS, where more than one is present) and all of its components can be operator-configurable using application(s) including computer code to run using the processor system 517, which may be implemented to include a CPU, which may include an Intel Pentium® processor or the like, or multiple CPUs.

The system 516 includes tangible computer-readable media having non-transitory instructions stored thereon/in that are executable by or used to program a server or other computing system (or collection of such servers or computing systems) to perform some of the implementation of processes described herein. For example, computer program code 526 can implement instructions for operating and configuring the system 516 to intercommunicate and to process webpages, applications and other data and media content as described herein. In some implementations, the computer code 526 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ActiveX®, any other scripting language, such as VBScript®, and many other programming languages as are well known may be used. (JAVA™ is a trademark of Sun Microsystems, Inc.).

FIG. 5 shows a block diagram of example implementations of elements of FIG. 5 and example interconnections between these elements according to some implementations. FIG. 5, also illustrates environment 510, but FIG. 5, various elements of the system 516 and various interconnections between such elements are shown with more specificity according to some more specific implementations. Elements from FIG. 5 that are also shown in FIG. 5 will use the same reference numbers in FIG. 5 as were used in FIG. 5. Additionally, in FIG. 5, the user system 512 includes a processor system 512A, a memory system 512B, an input system 512C, and an output system 512D. The processor system 512A can include any suitable combination of one or more processors. The memory system 512B can include any suitable combination of one or more memory devices. The input system 512C can include any suitable combination of input devices, such as one or more touchscreen interfaces, keyboards, mice, trackballs, scanners, cameras, or interfaces to networks. The output system 512D can include any suitable combination of output devices, such as one or more display devices, printers, or interfaces to networks.

Figure 6:
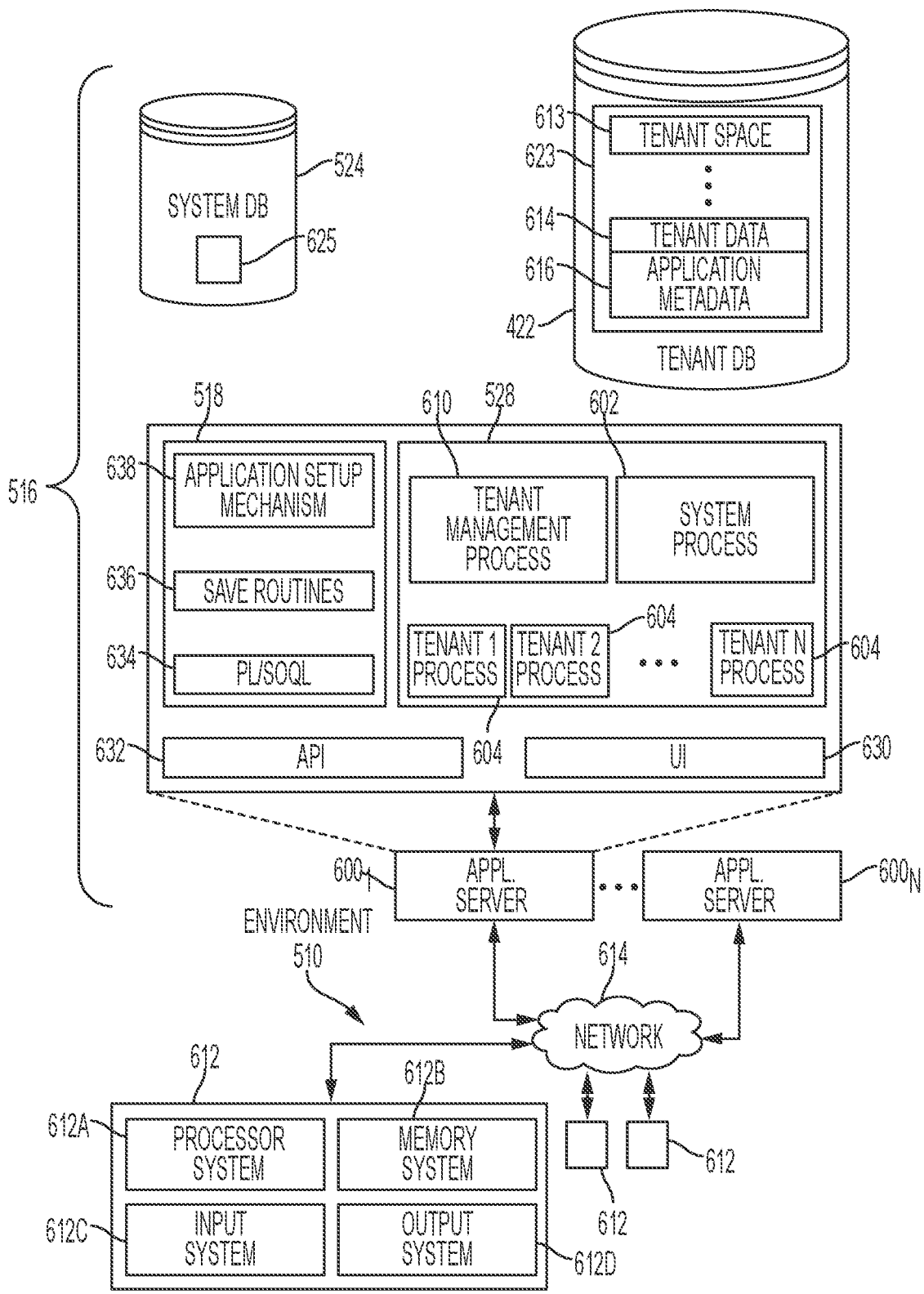
FIG. 6 is a block diagram representation of example implementations of elements of FIG. 5 and example interconnections between these elements according to some implementations.

In FIG. 6, the network interface 520 of FIG. 5 is implemented as a set of HTTP application servers 6001-600N. Each application server 600, also referred to herein as an "app server," is configured to communicate with tenant database 522 and the tenant data 623 therein, as well as system database 524 and the system data 625 therein, to serve requests received from the user systems 612. The tenant data 623 can be divided into individual tenant storage spaces 613, which can be physically or logically arranged or divided. Within each tenant storage space 613, tenant data 614 and application metadata 616 can similarly be allocated for each user. For example, a copy of a user's most recently used (MRU) items can be stored to tenant data 614. Similarly, a copy of MRU items for an entire organization that is a tenant can be stored to tenant storage space 613.

The process space 528 includes system process space 602, individual tenant process spaces 604 and a tenant management process space 610. The application platform 518 includes an application setup mechanism 638 that supports application users' creation and management of applications. Such applications and others can be saved as metadata into tenant database 522 by save routines 636 for execution by subscribers as one or more tenant process spaces 604 managed by tenant management process 610, for example. Invocations to such applications can be coded using PL/SOQL 634, which provides a programming language style interface extension to API 632. Invocations to applications can be detected by one or more system processes, which manage retrieving application metadata 616 for the subscriber making the invocation and executing the metadata as an application in a virtual machine.

The system 516 of FIG. 6 also includes a user interface (UI) 630 and an application programming interface (API) 632 to system 516 resident processes to users or users at user systems 612. In some other implementations, the environment 510 may not have the same elements as those listed above or may have other elements instead of, or in addition to, those listed above.

Each application server 600 can be communicably coupled with tenant database 522 and system database 524, for example, having access to tenant data 623 and system data 625, respectively, via a different network connection. For example, one application server 6001 can be coupled via the network 514 (for example, the Internet), another application server 600N can be coupled via a direct network link, and another application server (not illustrated) can be coupled by yet a different network connection. Transfer Control Protocol and Internet Protocol (TCP/IP) are examples of typical protocols that can be used for communicating between application servers 600 and the system 516. However, it will be apparent to one skilled in the art that other transport protocols can be used to optimize the system 516 depending on the network interconnections used.

In some implementations, each application server 600 is configured to handle requests for any user associated with any organization that is a tenant of the system 516. Because it can be desirable to be able to add and remove application servers 600 from the server pool at any time and for various reasons, in some implementations there is no server affinity for a user or organization to a specific application server 600. In some such implementations, an interface system implementing a load balancing function (for example, an F5 Big-IP load balancer) is communicably coupled between the application servers 600 and the user systems 612 to distribute requests to the application servers 600. In one implementation, the load balancer uses a least-connections algorithm to route user requests to the application servers 600. Other examples of load balancing algorithms, such as round robin and observed-response-time, also can be used. For example, in some instances, three consecutive requests from the same user could hit three different application servers 600, and three requests from different users could hit the same application server 600. In this manner, by way of example, system 516 can be a multi-tenant system in which system 516 handles storage of, and access to, different objects, data and applications across disparate users and organizations.

In one example storage use case, one tenant can be a company that employs a sales force where each salesperson uses system 516 to manage aspects of their sales. A user can maintain contact data, leads data, customer follow-up data, performance data, goals and progress data, etc., all applicable to that user's personal sales process (for example, in tenant database 522). In an example of an MTS arrangement, because all of the data and the applications to access, view, modify, report, transmit, calculate, etc., can be maintained and accessed by a user system 612 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 516 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 516 also can maintain system level data usable by multiple tenants or other data. Such system level data can include industry reports, news, postings, and the like that are sharable among tenants.

In some implementations, the user systems 612 (which also can be client systems) communicate with the application servers 600 to request and update system-level and tenant-level data from the system 516. Such requests and updates can involve sending one or more queries to tenant database 522 or system database 524. The system 516 (for example, an application server 600 in the system 516) can automatically generate one or more SQL statements (for example, one or more SQL queries) designed to access the desired information. System database 524 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7:
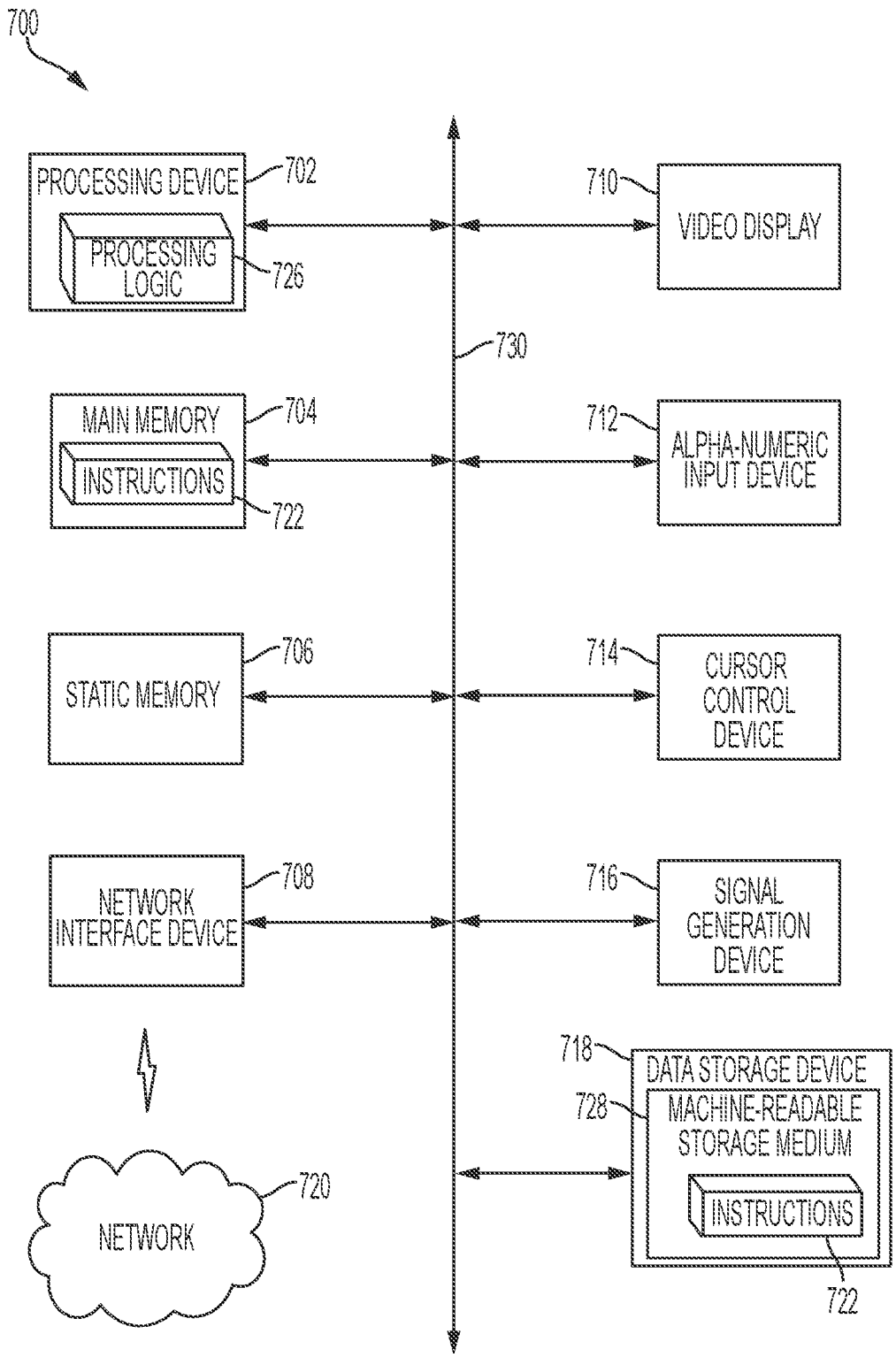
FIG. 7 is a diagrammatic representation of a machine in an exemplary form of a computer system within which a set of instructions, for causing the machine to perform any one or more of the methodologies discussed herein, may be executed.

FIG. 7 illustrates a diagrammatic representation of a machine in the exemplary form of a computer system 700 within which a set of instructions for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In at least one embodiment, computer system 700 may represent, for example, elements of the cloud-based computing platform or any other elements of FIG. 1 (e.g. clients, computing systems used by the customers 150, the third-party application exchange 160) or any elements of FIGS. 7 through 5, etc.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of in-memory buffer service 94) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general-purpose digital computer, by using a special-purpose computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, at least one embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiments. It should be understood that various changes can be made in the function and arrangement of elements without departing from the scope defined by the claims, which includes known equivalents and foreseeable equivalents at the time of filing this patent application.

What is claimed is:

1. A method for generating a digital access token consumable by a piggy-back service system, the method comprising:
receiving a request for the digital access token for a client, the digital access token being associated with a tenant;
generating at least one standard claim associated with a client attribute of the client;
generating the digital access token comprising a header, a payload, and a signature, wherein the payload includes the at least one standard claim associated with the client attribute and the digital access token enables the piggy-back service system to independently authorize access by the client to at least one service at the piggy-back service system based on the at least one standard claim; and
transmitting the digital access token to a first device associated with the client.

2. The method of claim 1, wherein the method further comprises:
determining a first client attribute, the first client attribute being a tenant identifier for the tenant;
generating a first standard claim comprising the tenant identifier for inclusion in the payload; and
generating the signature based on the header and the payload using a tenant specific private key associated with the tenant wherein the first standard claim in the payload enables the piggy-back service system to fetch a tenant specific public key associated with the tenant identifier to validate the signature.

3. The method of claim 1, wherein the method further comprises:
generating a digital token type of the digital access token, the digital token type defining a format and a version of the digital access token including the at least one standard claim in the payload; and
generating the header to include the digital token type to enable the piggy-back service system to assess the digital access token for authorization in accordance with the digital token type.

4. The method of claim 1, wherein the method further comprises:
determining a second client attribute, the second client attribute being a role with respect to the tenant; and
generating a second standard claim comprising the role for inclusion in the payload, wherein the second standard claim in the payload enables the piggy-back service system to authorize at least one permission associated with the access by the client to the at least one service at the piggy-back service system based on the role.

5. The method of claim 4, further comprising:
receiving a first token scope handler tied to a first open authorization scope, the first open authorization scope being associated with the inclusion of the role in the payload as the second standard claim; and injecting the role as the second standard claim in the payload of the digital access token in accordance with the first open authorization scope using the first token scope handler.

6. The method of claim 1, wherein the method further comprises:

determining a third client attribute, the third client attribute being tenant level access provided to the client by the tenant; and generating a third standard claim comprising the tenant level access for inclusion in the payload, wherein the third standard claim in the payload enables the piggy-back service system to authorize at least one permission associated with the access by the client to the at least one service at the piggy-back service system based on the tenant level access.

7. The method of claim 6, further comprising:

receiving a second token scope handler tied to a second open authorization scope, the second open authorization scope being associated with the inclusion of the tenant level access in the payload as the third standard claim; and injecting the tenant level access as the third standard claim in the payload of the digital access token in accordance with the second open authorization scope using the second token scope handler.

8. The method of claim 1, wherein the payload includes a standard subject claim and the method further comprises:

receiving an identity of the client;

determining a fourth client attribute, the fourth client attribute being an identity type based on one of the identity of the client and a user authorizing the request for the digital access token; and generating the standard subject claim to including the identity and the identity type for inclusion in the payload, wherein the standard subject claim in the payload enables the piggy-back service system to authorize permissions associated with the access by the client to the at least one service at the piggy-back service system based on the identify type.

9. The method of claim 8, further comprising:

receiving a third token scope handler tied to a third open authorization scope, the third open authorization scope being associated with the inclusion of the identity type in the standard subject claim of the payload; and injecting the identity and the identity type as the standard subject claim in the payload of the digital access token in accordance with the third open authorization scope using the third token scope handler.

10. The method of claim 1, further comprising:

identifying at least one tenant specific token setting for association with the digital access token; and enabling the at least one tenant specific token setting of the digital access token prior to transmission of the digital access token to the first device.

11. The method of claim 10, further comprising:

receiving a fourth token scope handler tied to a fourth open authorization scope, the fourth open authorization scope being associated with the at least one tenant specific setting; and associating the at least one tenant specific token setting with the digital access token in accordance with the fourth open authorization scope using the fourth token scope handler.

12. A system for generating a digital access token consumable by a piggy-back service system, the system comprising:

at least one processor; and at least one non-transitory machine-readable storage medium that stores instructions configurable to be executed by the at least one processor to:

receive a request for the digital access token for a client, the digital access token being associated with a tenant;

generate at least one standard claim associated with a client attribute of the client;

generate the digital access token comprising a header, a payload, and a signature, wherein the payload includes the at least one standard claim associated with the client attribute and the digital access token enables the piggy-back service system to independently authorize access by the client to at least one service at the piggy-back service system based on the at least one standard claim; and transmit the digital access token to a first device associated with the client.

13. The system of claim 12, wherein the instructions are configurable to be executed by the at least one processor to:

determine a first client attribute, the first client attribute being a tenant identifier associated with the tenant;

generate a first standard claim comprising the tenant identifier for inclusion in the payload; and generate the signature based on the header and the payload using a tenant specific private key associated with the tenant, wherein the first standard claim in the payload enables the piggy-back service system to fetch a tenant specific public key associated with the tenant identifier to validate the signature.

14. The system of claim 12, wherein the instructions are configurable to be executed by the at least one processor to:

determine a second client attribute, the first second client attribute being a role with respect to the tenant; and generate a second standard claim comprising the role for inclusion in the payload, wherein the second standard claim in the payload enables the piggy-back service system to authorize at least one permission associated with the access by the client to the at least one service at the piggy-back service system based on the role.

15. The system of claim 12, wherein the instructions are configurable to be executed by the at least one processor to:

determine a third client attribute, the third client attribute being tenant level access provided to the client by the tenant; and generate a third standard claim comprising the tenant level access for inclusion in the payload, wherein the third standard claim in the payload enables the piggy-back service system to authorize at least one permission associated with the access by the client to the at least one service at the piggy-back service system based on the tenant level access.

16. A non-transitory machine-readable storage medium that stores instructions executable by at least one processor, the instructions configurable to cause the at least one processor to perform operations comprising:

receiving a request for a digital access token for a client, the digital access token being associated with a tenant;

generating at least one standard claim associated with a client attribute of the client;

generating the digital access token comprising a header, a payload, and a signature, wherein the payload includes the at least one standard claim associated with the client attribute and the digital access token enables a piggy-back service system to independently authorize access by the client to at least one service at the piggy-back service system based on the at least one standard claim; and transmitting the digital access token to a first device associated with the client.

17. The non-transitory machine-readable storage medium of claim 16, wherein the instructions are configurable to cause the at least one processor to further perform operations comprising:

determining a first client attribute, the first client attribute being a tenant identifier of the tenant;

generating a first standard claim comprising the tenant identifier for inclusion in the payload; and generating the signature based on the header and the payload using a tenant specific private key associated with the tenant, wherein the first standard claim in the payload enables the piggy-back service system to fetch a tenant specific public key associated with the tenant identifier to validate the signature.

18. The non-transitory machine-readable storage medium of claim 16, wherein the instructions are configurable to cause the at least one processor to further perform operations comprising:

generating at least one tenant specific token setting for association with the digital access token; and enabling the at least one tenant specific token setting of the digital access token prior to transmission of the digital access token to the first device.

19. The non-transitory machine-readable storage medium of claim 16, wherein the instructions are configurable to cause the at least one processor to further perform operations comprising:

determining a second client attribute, the first second client attribute being a role with respect to the tenant; and generating a second standard claim comprising the role for inclusion in the payload, wherein the second standard claim in the payload enables the piggy-back service system to authorize at least one permission associated with the access by the client to the at least one service at the piggy-back service system based on the role.

20. The non-transitory machine-readable storage medium of claim 16, wherein the instructions are configurable to cause the at least one processor to further perform operations comprising:

determining a third client attribute, the third client attribute being tenant level access provided to the client by the tenant; and generating a third standard claim comprising the tenant level access for inclusion in the payload, wherein the third standard claim in the payload enables the piggy-back service system to authorize at least one permission associated with the access by the client to the at least one service at the piggy-back service system based on the tenant level access.

\* \* \* \* \*